United States Patent [19]

Lukander

[11] Patent Number: 5,818,594

[45] Date of Patent: Oct. 6, 1998

[54] METHOD AND APPARATUS FOR MEASURING THE DIMENSIONS OF THREE-DIMENSIONAL OBJECTS SUCH AS CHIPS USED IN PULP MANUFACTURE

[76] Inventor: Ronald Lukander, P O B 125, Espoo, Finland, 02201

[21] Appl. No.: 695,803

[22] Filed: Aug. 12, 1996

Related U.S. Application Data

[63] Continuation of Ser. No. 364,487, Dec. 27, 1994, abandoned.

[51] Int. Cl.[6] ................................................ G01B 11/24
[52] U.S. Cl. ...................... 356/376; 356/379; 250/559.22
[58] Field of Search ................................... 356/372, 375, 356/376, 379, 383, 386; 250/561, 223 R, 559.08, 559.29, 559.24, 559.36, 559.37

[56] References Cited

U.S. PATENT DOCUMENTS 4,063,820  12/1977  Borgese ................... 356/372
4,105,925  8/1978   Rossol et al. ............. 356/375
4,873,651  10/1989  Raviv ...................... 356/375
5,013,927  5/1991   Tsikos et al. ............. 356/376

FOREIGN PATENT DOCUMENTS 903263    6/1990   Finland .
894961    4/1991   Finland .
894962    4/1991   Finland .
894963    4/1991   Finland .
WO8809914 12/1988  WIPO .

*Primary Examiner*—Hoa Q. Pham
*Attorney, Agent, or Firm*—Dowell & Dowell P.C.

[57] ABSTRACT

A method and apparatus for recording light reflecting and shadowed areas of a three-dimensional object which is conveyed relative to a detector wherein the object is alternately illuminated from a plurality of different directions utilizing flashes of light which are synchronized with respect to the scan frequency of the detector whereby the recorded information may be utilized to determine the dimensions of the object.

4 Claims, 5 Drawing Sheets

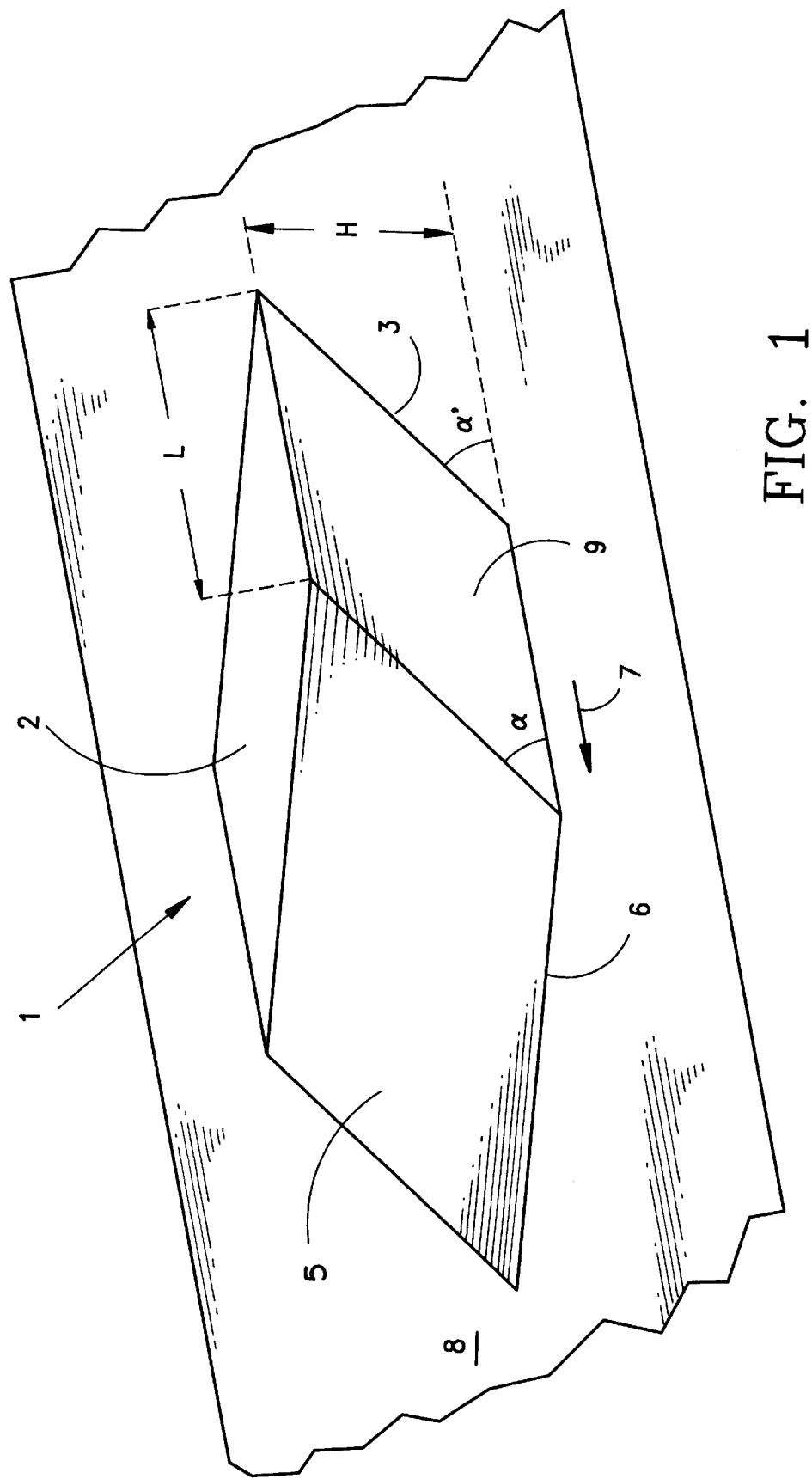

METHOD AND APPARATUS FOR MEASURING THE DIMENSIONS OF THREE-DIMENSIONAL OBJECTS SUCH AS CHIPS USED IN PULP MANUFACTURE

CROSS REFERENCE TO RELATED APPLICATIONS

This application is a continuation of application Serial No. 08/364,487 filed Dec. 27, 1994, now abandoned.

BACKGROUND OF THE INVENTION

1. Field of the Invention

The invention relates to a method for measuring the dimensions of three-dimensional objects such as chips used in pulp manufacture.

The invention also concerns an apparatus capable of implementing the method.

2. Description of the Prior Art

The measurement of chips entering a pulping process for their size distribution, cutting angle and absolute size gives important information for the pulping process.

Known from FI Pat. Appl. 891,641 is a method of measuring the dimensions of chips, the method comprising illuminating the chips by collimated light projected from a certain direction and detecting the lateral displacement of projected light line due to the height dimension of the chip being measured and determining the height dimension of the chip at the light line on the basis of the detected lateral shift of the light line.

The determination of the cutting surface geometry by means of this method is tedious. Moreover, the method is expensive and requires an expensive light source for producing the collimated light beam.

SUMMARY OF THE INVENTION

It is an object of the present invention to overcome the shortcomings of prior-art techniques and to achieve an entirely novel method and apparatus for measuring the dimensions of wood chips used in pulp manufacture.

The method according to the invention is based on illuminating the object being measured alternately from at least three different directions and then determining the dimensions of the object from the shape and size of patterns of different intensities formed by the lights projected from the different directions.

The apparatus according to the invention is advantageously based on comprising four separate light fixtures.

More specifically, the method according to the invention is characterized by being directed to the measuring of dimensions of randomly oriented three-dimensional objects such as wood chips used in pulp manufacture. The method includes the steps of illuminating an object as it is conveyed relative to a detector, such as a camera, for recording patterns formed by illumination of the object as the object is moved. The object is illuminated alternately from different directions with light flashes synchronized with respect to the scan frequency of the camera. Further, the dimensions of the object may be determined from the sizes and shapes of reflected areas and shadow areas which are detected and which differ in intensity depending upon the relative position between the object and the camera as the object is alternately illuminated.

Furthermore, the apparatus according to the invention is characterized by an apparatus for recording images of a randomly oriented three-dimensional object such as wood chips used in pulp manufacture wherein the objects are conveyed relative to a detector such as a camera. The apparatus obtains information with respect to the object which may be utilized for measuring the dimensions of the object. The apparatus includes a plurality of light means for illuminating the object and a detector for recording light patterns formed by the illumination of the object. The apparatus further includes means for controlling the light means in such a fashion that the object to be recorded becomes illuminated alternately from different directions by sequentially flashing the light means so as to correspond to a scan frequency of the detector.

The invention offers significant benefits.

The invention makes the size and shape determination of most complicated objects easy. Only one detector unit is required thus keeping the cost of the apparatus at a reasonable level. Moreover, the length dimension (the grain direction) can be selectively distinguished from the width dimension of the chip particularly owing to the multidirectional illumination scheme.

BRIEF DESCRIPTION OF THE DRAWINGS

In the following, the invention will be examined in more detail with reference to the attached drawings, in which:

FIG. 1 is a perspective view of the typical measurement object for the invention, namely, a wood chip;

DESCRIPTION OF THE PREFERRED EMBODIMENT

Figure 4:
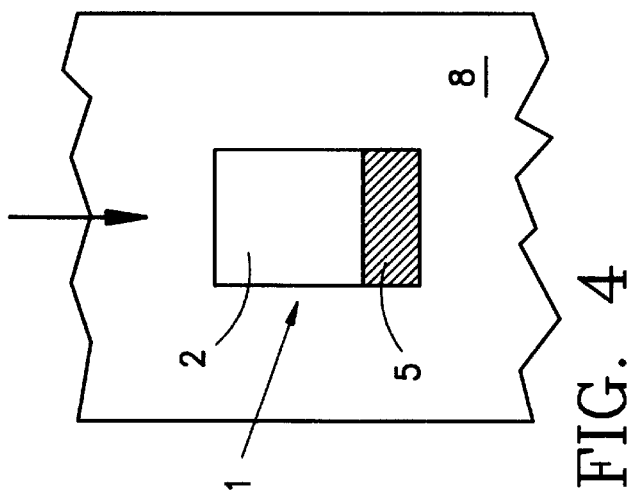
FIG. 4 is a top view of the wood chip illustrated in FIG. 1 under rear illumination according to the invention.

With reference to FIG. 1, a wood chip 1 exiting a chipper typically is an object with a geometric form having essentially parallel cut sides 5 and 3, of which the cut side 5 in this context is termed the front side, and correspondingly, the cut side 3 the rear side. The slope of the cut sides is determined by the angle of the cutting knife relative to the wood block entering the chipper. The top side 2 and the bottom side 6, respectively, are also essentially parallel to each other. Because the wood grain passes, as indicated by arrows 7 in the diagram, through the front side 5 and the rear side 3 due to the chipping techniques conventionally used, also the distance H of the top side 2 from the bottom side 6 is dependent among other things such as grain density of the wood and the geometry of the chip producing machine. The dimension H is statistically dependent on the length L of the chip under given conditions with a wide dimensional distribution between the individual chips. All dimensions, length, width and thickness and the variations within those dimensions are important for different reasons in the various pulping processes. For example the length, the distance L between the front side 5 and the rear side 3, determines the average fiber length in the produced pulp. The thickness H is important for the liquor penetration of the chips in the pulping process. Variations in the overall size distribution effects the pulping process since a continuous process benefits from a uniform raw material supply into the process. To simplify the examination of the invention, the conveyor band 8 conveying the chip 1 is assumed to travel in the direction denoted by arrow 7 in the diagram. The band 8 typically is a side-stream derouted from the main stream of chips 1 exiting the chipper. In the side-stream to the measurement apparatus, the individual chips must travel separated at a distance from each other. A typical size for the chip is 4×18×22 mm3 (thickness×width×length). The sides 9 of the chip 1 are essentially parallel to each other, and in the position of the chip shown in the diagram, typically essentially vertical.

Figure 2:
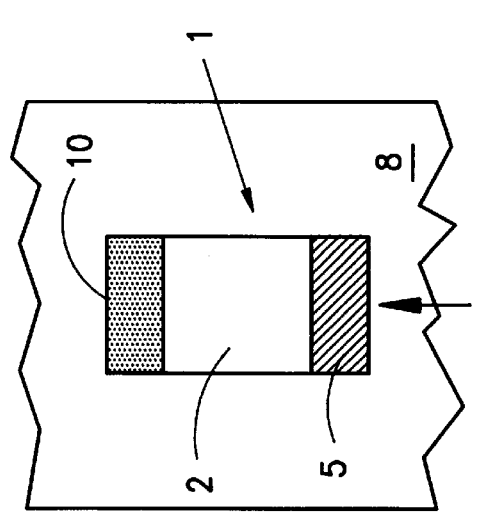
FIG. 2 is a top view of the wood chip illustrated in FIG. I under front illumination according to the invention.
Figure 3:
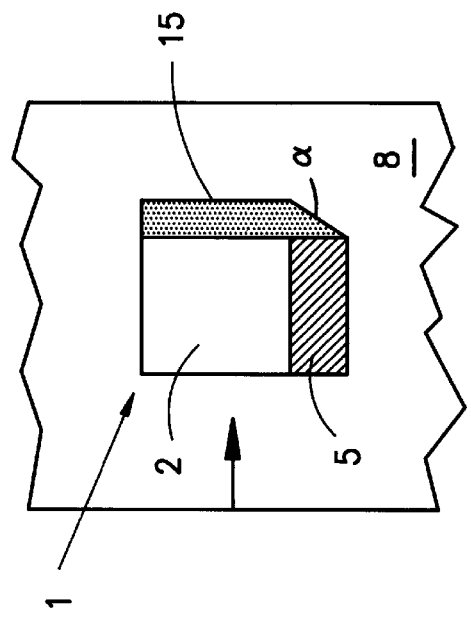
FIG. 3 is a top view of the wood chip illustrated in FIG. 1 under side illumination according to the invention.

With reference to FIGS. 2–4, the different exposure steps of chip illumination are illustrated. According to the invention, during each exposure only a very thin "slice" orthogonally to the travel direction, as shown by the arrows, of the band 8 will be imagined as the detector employed is a line camera. For greater clarity, FIGS. 2–4 show only the illuminated object, not the image formed by the apparatus from the object. To simplify the examination, the chip in the diagrams is shown in a position oriented parallel to the band. In practice, the position of the chip will be random.

With reference to FIG. 2, the chip 1 is shown illuminated directly from in front. The light beam is tilted at an approx. 25° angle relative to the band 8. The illumination produces four different types of surfaces in the scan field of the camera: a rear surface defined by the band 8, an oblique cut surface 5, an essentially horizontal upper surface defined by the band 2 and a shadow 10. Good resolution in distinguishing the rear surface 8 from the upper surface 2 can be assured by selecting the material of the band 8 to have reflecting properties clearly different from those of the chip upper surface. Respectively, unambiguous distinguishing of the cut surface 5 from the shadow 10 is assured by arranging the illumination to expose the object from different directions in a manner described later in the text.

With reference to FIG. 3, the light illuminating the object from the left forms a side shadow 15 whose shape permits an easy determination of the angle α of the front cut side 5. The same shadow 15 also is employed in the determination of the chip's height profile. By virtue of the side illumination, the area 10 in FIG. 2 may now be interpreted unambiguously as a shadow. A similar mirrored shadow pattern will also be produced by side illumination from the right.

With reference to FIG. 4, the rear illumination gives additional confirmation on the nature of the area 10. Moreover, the height of the upper edge of the front cut surface 5 can be assured with the help of the possibly formed shadow pattern. If the slope of the front cut surface is smaller than the tilt angle of the illuminating light beam, the surface 5 will be seen darker in the rear illumination exposure than in the front illumination exposure shown in FIG. 2, and in the case that the slope of the cut surface is steeper than the tilt angle of the light beam (which is a desirable situation), the surface 5 will be recorded with still deeper darkness in the rear illumination exposure. Then, the surface 5 can be positively resolved as a cut surface. Moreover, this surface forms the shortest shadow.

As is evident from the above discussion, the shape of a chip ideally oriented orthogonally to the light fixtures as illustrated in FIGS. 1–4 could in principle be determined by two different exposures: from the front and from the side. In practice the chips are oriented in a random fashion on the band, and accordingly, exposures from all four directions of illumination are required.

Figure 5:
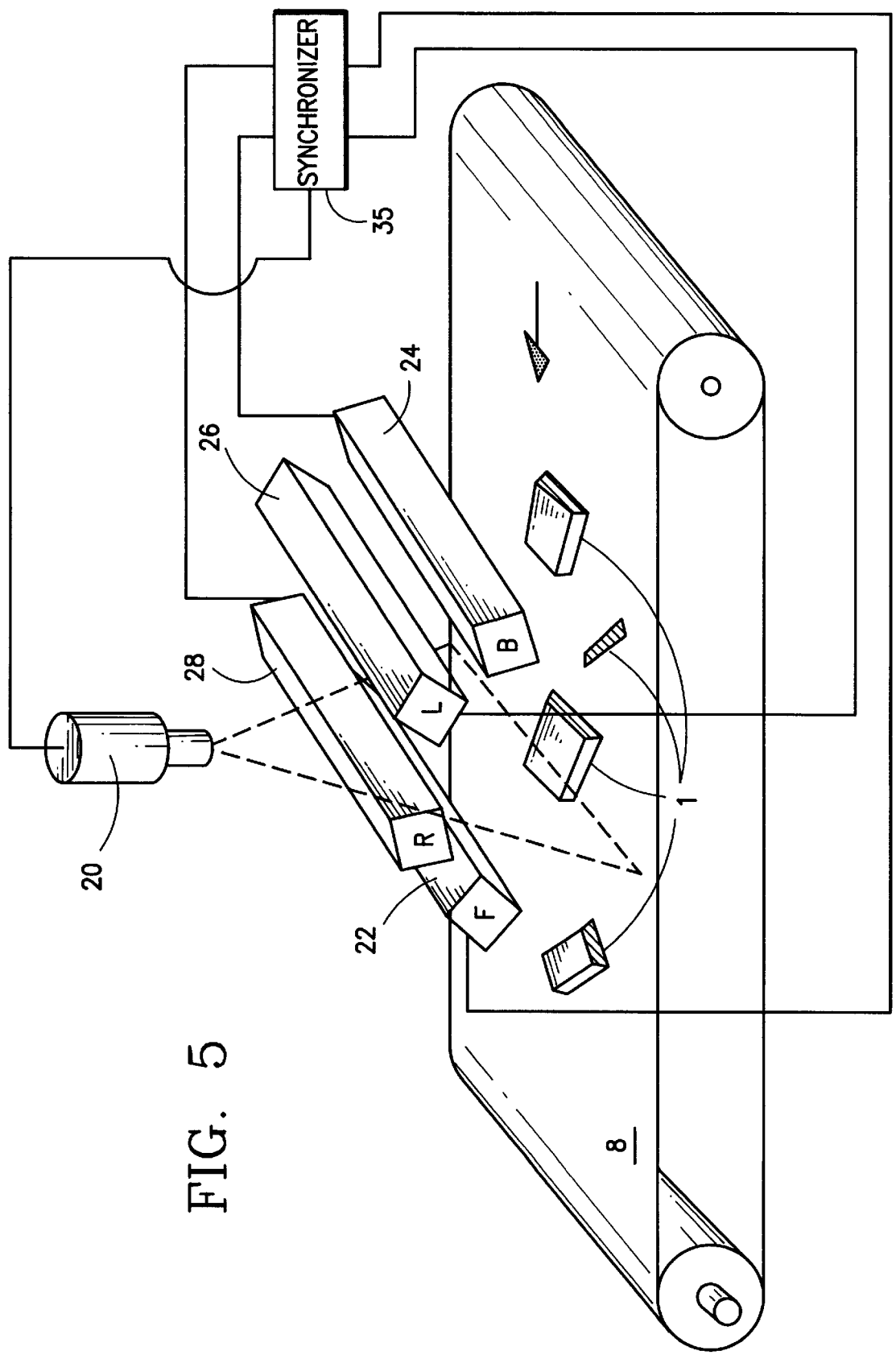
FIG. 5 is a perspective view of a measurement apparatus according to the invention.

With reference to FIG. 5, the chips 1 are transported on a conveyor band 8 toward a measurement apparatus comprising a detector 20, a front light fixture 22, a rear light fixture 24, a left light fixture 26 and a right light fixture 28. The tilt angle of the light units of side light fixtures 26, 28 is set as 45° relative to the horizontal plane. The light fixtures 26, 28 themselves are placed approximately above the object to be illuminated. Both the mounting and tilt angles of the front light fixtures 22 and the rear light fixtures 24 are advantageously smaller than 37° relative to the horizontal plane. The light fixtures are aligned so that the front lights 22 and rear lights 24 project their light beams parallel to the travel direction of the conveyor band 8, while the side lights are aligned orthogonal to the travel direction of the band 8. The lights are flashed sequentially, by a synchronizer 35 and each exposure is recorded by means of a detector 20 scanning synchronously with the alternate flashes of the lights. The alignment of the left light fixture 26 and the right light fixture 28 is implemented by means of individual alignment of the light units housed in the light fixture. By contrast, the front lights 22 and the rear lights 24 are comprised of assembled light array fixtures, whose alignment is accomplished by tilting the entire fixture. The exposure time typically is in the range 0.5–2 ms. The speed of the conveyor band 8 typically is approx. 400 m/min. The detector 20 is appropriately a line array detector. In practice the chips 1 are in entirely random positions on the band. However, the shapes of such objects can be resolved from the lighted and shadow areas produced by the alternate flashes of the lights as described for the examples illustrated in FIGS. 2–4. In practice the apparatus according to the invention records a striped image of the chip. The chip 1 is imaged in slices orthogonal to the travel direction of the conveyor band so that the direction of the illuminating light alternates in the sequential slices. According to the example described above, the image of each chip comprises slices formed by approx. 50 flash exposures. Then, the slanted surfaces of the chip (cut surface 5), for instance, are seen strongly striped in such a sliced image. Because the cut surface 5 is readily resolved in this manner, distinguishing the length dimension of the chip from its width dimension is easy thereinafter as the cut surface 5 is orthogonal to the longitudinal axis of the chip 1.

Figure 6:
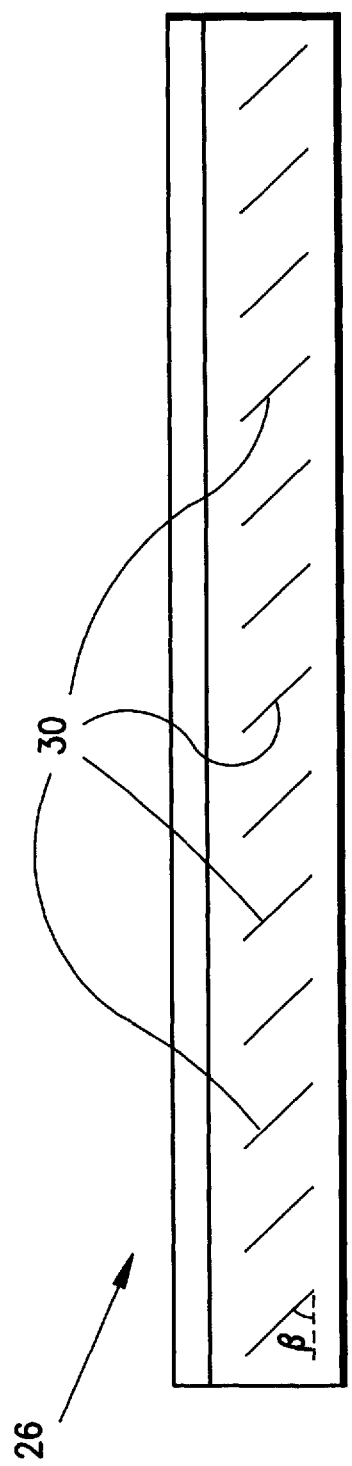
FIG. 6 is a detailed view of the left side light fixture of the measurement apparatus illustrated in FIG. 5 as seen from the entrance direction of the chips.

With reference to FIG. 6, the appropriate tilt angle of the left light fixture 26 is aligned by tilting the individual light units 30 to a desired, angle β relative to the horizontal plane, which angle in the described case is 45°. The light units 30 can be, e.g., light-emitting diodes (LED) placed in a protective tube. The LED lamp is an advantageous choice in terms of small size and short turn-off time. To achieve homogenous illumination, the LEDs are placed as close to each other as possible. In practice the mutual spacing of the LEDs will typically be approx. 5–10 mm. The assembled light array fixture 26 is placed orthogonal to the conveyor band 8. This arrangement achieves a consistent formation of the shadow over the entire width of the band irrespective of the position of the chip 1. The alignment of the light units in the right light fixture 28 is implemented in a similar manner, however, by rotating the light units to the opposite direction. By contrast, the light units of the front light fixture 22 and the rear light fixture 24 are fixed to a perpendicular position in the light array, and accordingly, their alignment is implemented by rotating the entire light array fixture.

Figure 7:
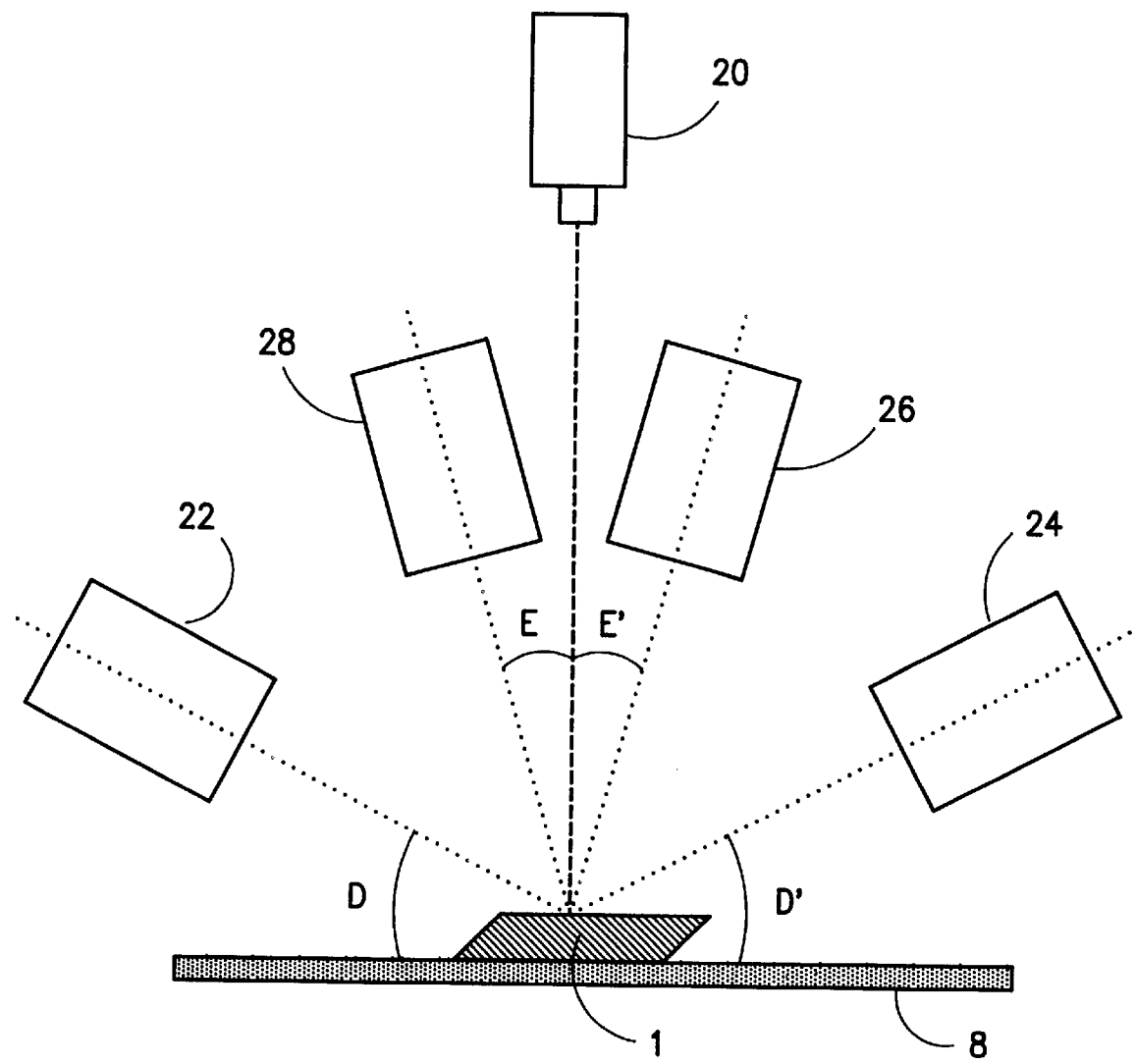
FIG. 7 is a side view of the measurement apparatus illustrated in FIG. 5.

As the chipper typically cuts the chip to a 37° angle of the chip cut surface, the angle of illumination is advantageously adjusted not greater than this angle relative to the horizontal plane. With reference to FIG. 7, the angle of illumination must be understood to refer to the tilt angle β of the side lights 26 and 28 and the tilt angle of the front lights 22 and the rear lights 24. This arrangement provides improved resolution in the detection of the cut surfaces of the chip. However, as all four illumination directions are available and arranging an acute tilt angle particularly for the side lights is difficult in practice, the side lights are in a working embodiment set to a 45° tilt angle. The front and rear lights are easier to tilt to an acute angle, and accordingly, the angles D and D' are set to approx. 25° as shown in the diagram. The angles D and D' may be different from each other, whereby such difference is taken into account in the computational processing of the image information. As shown in the diagram, the side lights 28 and 26 are aligned to a small angle E and E' relative to the vertical. These angles are typically approx. 10° and they may be different from each other. In the ideal case the angles E and E' could be zero, and tilting of the lights to a small angle is necessary only to the end of assuring a free field of view for the camera 20. Also this tilt angle is easy to take into account in the computational processing.

Accordingly, the illumination angle may vary in the range 20°–55°.

The light fixtures 22, 24, 26 and 28 may in principle be located freely about the detector 20 within the constraint of the optimal illumination angle. Accordingly, freely selected directions of illumination can be used instead of symmetrically placed lights used in the exemplifying embodiment illuminating the object from in front, rear and directly at side. However, the directions of illumination must be uniquely defined in the image analysis program to obtain correct dimensions for the chip from the recorded data of the exposures.

The embodiment according to the invention may also be used for, e.g., size and shape determination of fertilizer grains. Obviously, the invention is as well suited for the measurement of size and shape distributions of other similar mass products (drugs, plastic beads, etc.).

In present state of the art, the band 8 can be driven at speeds 100–800 mm/s.

I claim:

1. A method of recording images of a randomly oriented three-dimensional object using a detector wherein detected images are used in determining the dimensions of the object, the method of detecting comprising the steps of:

a) conveying the object on a support surface relative to the detector;

b) alternately illuminating the object from above the support surface as the object is conveyed in a first direction utilizing a plurality of light sources disposed so as to illuminate the object from a plurality of different directions relative thereto using light flashes from the light sources which light flashes are synchronized with a scan frequency of the detector, a first two of the plurality of light sources illuminating the object at a tilt angle relative to a plane defined by the support surface of approximately 20° to 55° forwardly and rearwardly of the object in the first direction, respectively, and a second two of the plurality of light sources illuminating the object at a tilt angle relative to a plane defined by the support surface of approximately 20° to 55° on opposite sides thereof and generally orthogonally to the first direction, and the second two light sources each including a plurality of light units each being oriented so as to illuminate the object at tilt angles of approximately 37° to 55° with respect to the plane of the support surface, and c) detecting sizes and shapes of areas reflecting light from the object and shadow areas cast by the object as the object is alternately illuminated.

2. The method of claim 1 in which the tilt angle is approximately 45°.

3. An apparatus for detecting reflected images of a randomly oriented three-dimensional object being conveyed on a support surface in a first direction relative to the apparatus which images are used in measuring the dimensions of the object, the apparatus comprising a plurality of light means mounted above the support surface and being oriented at different positions so as to illuminate the object to be recorded from different directions, a detector means disposed above the support surface for recording areas reflecting light from the object and shadow areas cast by the object caused by the illumination of the object, synchronization means for controlling the plurality of light means so as to illuminate the object alternately from the different directions by sequentially flashing said plurality of light means in synchronization with a scan frequency of said detector means, said plurality of light means including first and second lights positioned in spaced relationship in front of and to the rear of the object along the first direction, respectively, said first and second lights being positioned so as to illuminate the object alternately at tilt angles relative to the first direction of approximately 20° to 55°, third and fourth lights positioned to illuminate the object generally orthogonally relative to said first direction, said third and fourth lights being positioned so as to alternately illuminate the object at tilt angles of approximately 20° to 55° relative to the first direction, and said third and fourth lights each including a plurality of separate light units, each of said separate light units being positioned so as to illuminate the object at tilt angles between 37° and 55° with respect to said first direction whereby the size and shapes of areas reflecting light from the object and shadow areas cast by the object are detected by the detector means.

4. The apparatus of claim 3 in which said light units are positioned so as to illuminate the objects at tilt angles of approximately 45° with respect to said first direction.

* * * * *